US012681323B2

(12) United States Patent (10) Patent No.: US 12,681,323 B2

Hong et al. (45) Date of Patent: Jul. 14, 2026

(54) LIGHT RAY MODULATION ELEMENT HAVING MULTIPLE VIEWPOINT UNITS, GLASSES AND 3D DISPLAY SYSTEM

(71) Applicants: BEIJING BOE TECHNOLOGY DEVELOPMENT CO., LTD., Beijing (CN); BOE Technology Group Co., Ltd., Beijing (CN)

(72) Inventors: Tao Hong, Beijing (CN); Jian Gao, Beijing (CN); Sen Ma, Beijing (CN); Xue Dong, Beijing (CN); Jing Yu, Beijing (CN)

(73) Assignee: Beijing Shiyan Technology Co., Ltd., Beijing (CN)

( * ) Notice: Subject to any disclaimer, the term of this patent is extended or adjusted under 35 U.S.C. 154(b) by 303 days.

(21) Appl. No.: 18/579,976

(22) PCT Filed: Jan. 3, 2023

(86) PCT No.: PCT/CN2023/070212

§ 371 (c)(1),
(2) Date: Jan. 17, 2024

(87) PCT Pub. No.: WO2023/160258

PCT Pub. Date: Aug. 31, 2023

(65) Prior Publication Data

US 2024/0319517 A1 Sep. 26, 2024

(30) Foreign Application Priority Data

Feb. 28, 2022 (CN) .......................... 202210213237.2

(51) Int. Cl.
*G02B 27/00* (2006.01)
*G02B 27/01* (2006.01)
(Continued)

(52) U.S. Cl.
CPC .......... *G02B 30/27* (2020.01); *G02B 27/0093* (2013.01); *G02B 2027/0178* (2013.01); *G02B 30/28* (2020.01)

(58) Field of Classification Search
CPC .................. G02B 2027/0178; G02B 30/27–29
See application file for complete search history.

(56) References Cited

U.S. PATENT DOCUMENTS

2005/0063029 A1* 3/2005 Khazova ................ G02B 30/27
359/3
2010/0091095 A1 4/2010 Sung et al.
(Continued)

FOREIGN PATENT DOCUMENTS

CN 105549212 A 5/2016
CN 105700320 A 6/2016
(Continued)

OTHER PUBLICATIONS

Office Action dated Apr. 14, 2023, issued in counterpart CN Application No. 202210213237.2, with English translation. (13 pages).

*Primary Examiner* — Ryan S Dunning
(74) *Attorney, Agent, or Firm* — WHDA, LLP

(57) ABSTRACT

The present application provides a light-ray modulating element, an eyeglass and a 3D displaying system. The light-ray modulating element is applied to a 3D displaying system, the 3D displaying system includes a 3D displaying device, and the 3D displaying device includes a display panel, and a lens unit disposed at a light exiting side of the display panel; light rays emitted by the display panel pass through the lens unit, are shot to the light-ray modulating element, and form two first viewpoint units at a light entering side of the light-ray modulating element, wherein each of the first viewpoint units includes at least two first viewpoints; and the light-ray modulating element is config- (Continued)

ured for converging light rays emitted by each of the first viewpoint units to form a second viewpoint unit.

18 Claims, 10 Drawing Sheets

(51) Int. Cl.
  *G02B 30/27*    (2020.01)
  *G02B 30/28*    (2020.01)

(56)     References Cited

U.S. PATENT DOCUMENTS

| | | | |
|---|---|---|---|
| 2013/0093861 A1* | 4/2013 | Itoh | G02B 30/27 |
| | | | 348/51 |
| 2015/0009561 A1* | 1/2015 | Pacher | G02B 30/25 |
| | | | 359/464 |
| 2017/0108702 A1 | 4/2017 | Rabner | |
| 2018/0210208 A1 | 7/2018 | Zhou et al. | |
| 2018/0314075 A1* | 11/2018 | Zhang | G02F 1/134309 |

FOREIGN PATENT DOCUMENTS

| | | | |
|---|---|---|---|
| CN | 106526875 A | 3/2017 |
| CN | 107357047 A | 11/2017 |
| CN | 206618900 U | 11/2017 |
| CN | 108196374 A | 6/2018 |
| CN | 108205198 A | 6/2018 |
| CN | 108415173 A | 8/2018 |
| CN | 108563028 A | 9/2018 |
| CN | 110045509 A | 7/2019 |
| CN | 110471190 A | 11/2019 |
| CN | 110727115 A | 1/2020 |
| CN | 111198448 A | 5/2020 |
| CN | 112859337 A | 5/2021 |
| CN | 114355622 A | 4/2022 |
| JP | 2008-015121 A | 1/2008 |
| JP | 2016-192712 A | 11/2016 |
| JP | 2019-101115 A | 6/2019 |
| JP | 2020-118963 A | 8/2020 |
| JP | 2021-064834 A | 4/2021 |
| WO | 2014/189198 A1 | 11/2014 |

* cited by examiner screen+Lens
(object plane)

screen+Lens
(object plane)

LIGHT RAY MODULATION ELEMENT HAVING MULTIPLE VIEWPOINT UNITS, GLASSES AND 3D DISPLAY SYSTEM

CROSS REFERENCE TO RELEVANT APPLICATIONS

The present application claims the priority of the Chinese patent application filed on Feb. 28, 2022 before the Chinese Patent Office with the application number of 202210213237.2 and the title of "LIGHT RAY MODULATION ELEMENT, GLASSES AND 3D DISPLAY SYSTEM", which is incorporated herein in its entirety by reference.

TECHNICAL FIELD

The present disclosure relates to the technical field of displaying and, more particularly, to a light-ray modulating element, an eyeglass and a 3D displaying system.

BACKGROUND

The human eyes, when observing the real world, generate stereoscopic vision by using binocular parallax. According to that principle, researchers have developed 3D displaying devices based on the parallax. Naked-eye 3D displaying devices develops rapidly, and occupies an important position in the field of 3D displaying. However, naked-eye 3D displaying devices easily cause the human eyes to have vergence-accommodation conflict, to generate visual fatigue, which in turn causes the user to have adverse experiences such as dizziness.

SUMMARY

The embodiments of the present application employ the following technical solutions:

In an aspect, a light-ray modulating element is provided, wherein the light-ray modulating element is applied to a 3D displaying system, the 3D displaying system includes a 3D displaying device, and the 3D displaying device includes a display panel, and a lens unit disposed at a light exiting side of the display panel;

wherein light rays emitted by the display panel pass through the lens unit, are shot to the light-ray modulating element, and form two first viewpoint units at a light entering side of the light-ray modulating element, each of the first viewpoint units includes at least two first viewpoints; and the light-ray modulating element is configured for converging light rays emitted by each of the first viewpoint units to form a second viewpoint unit, so that all of viewpoints of the second viewpoint unit enter a corresponding single-eye pupil at a same time, wherein the second viewpoint unit includes at least two second viewpoints.

Optionally, the light-ray modulating element includes a plurality of light-ray modulating units, and each of the light-ray modulating units is configured for converging light rays emitted by the first viewpoints to form the second viewpoints, so that the second viewpoints enter the corresponding single-eye pupil; and quantities of the first viewpoints, the second viewpoints and the light-ray modulating units are equal.

Optionally, visual-area widths of the first viewpoints in a first direction are equal, and visual-area widths of the second viewpoints in the first direction are equal.

Optionally, the visual-area widths of the first viewpoints in the first direction $w=LP/f$;

wherein L is a distance between the light-ray modulating element and the lens unit, P is a width of a pixel unit in the display panel in the first direction, and f is a height of placement of a lens in the lens unit.

Optionally, a width of a displaying main-lobe region formed by the lens unit in the first direction $W=nw$, wherein n is the quantity of the first viewpoints, and w is the visual-area widths of the first viewpoints in the first direction.

Optionally, in the second viewpoint unit, an intersection point of marginal rays of the second viewpoints in a human eye is a first intersection point, and a distance between the first intersection point and the light-ray modulating element $B=WA/(W-nV)$;

wherein W is the width of the displaying main-lobe region formed by the lens unit in the first direction, A is a distance between the light-ray modulating element and a pupil of the human eye, n is the quantity of the first viewpoints, and V is the visual-area widths of the second viewpoints in the first direction.

Optionally, the light-ray modulating element includes a liquid-crystal modulating element;

the liquid-crystal modulating element includes a first substrate and a second substrate that face each other, a liquid-crystal layer and an electrode layer, the liquid-crystal layer is disposed between the first substrate and the second substrate, and the electrode layer is disposed at at least one side of the liquid-crystal layer; the first substrate is closer to the display panel than the second substrate is; and the liquid-crystal layer is configured for, by effect of an electric field generated by the electrode layer, being capable of modulating a phase of incident light rays.

Optionally, the electrode layer includes a first electrode and a second electrode, and the first electrode and the second electrode are disposed at two opposite sides of the liquid-crystal layer; and the first electrode includes a plurality of strip electrodes, and the second electrode includes a planar electrode.

Optionally, the liquid-crystal modulating element further includes a polarizer, and the polarizer is disposed at one side of the first substrate close to the display panel.

Optionally, the light-ray modulating element includes a holographic interference element of at least one wavelength.

Optionally, when the light-ray modulating element includes holographic interference elements of multiple wavelengths, the light-ray modulating element includes a red-light-wavelength holographic interference element, a green-light-wavelength holographic interference element and a blue-light-wavelength holographic interference element that are arranged in layer configuration.

In another aspect, an eyeglass is provided, wherein the eyeglass includes the light-ray modulating element according to any one of the above embodiments.

Optionally, the eyeglass further includes a photographing unit, and the photographing unit is configured for, when the light-ray modulating element is at an initial position, while the photographing unit is moving in a first direction, photographing an image formed by the first viewpoints, and when the image changes, recording a movement distance, and transmitting the movement distance to the 3D displaying device.

Optionally, the eyeglass includes an eyeglass frame, the light-ray modulating element is disposed inside a space defined by the eyeglass frame, and the photographing unit is fixed to the eyeglass frame.

In yet another aspect, a 3D displaying system is provided, wherein the 3D displaying system includes the eyeglass stated above.

Optionally, the 3D displaying system further includes a 3D displaying device, the 3D displaying device includes the display panel, the lens unit disposed at the light exiting side of the display panel, and a system controlling unit, and the system controlling unit is electrically connected to the light-ray modulating element of the eyeglass;

wherein light rays emitted by the display panel pass through the lens unit, are shot to the light-ray modulating element, and form two first viewpoint units at a light entering side of the light-ray modulating element, each of the first viewpoint units includes at least two first viewpoints;

the system controlling unit is configured for, according to a predetermined algorithm, calculating visual-area widths of the first viewpoints in the first direction, and transmitting the visual-area widths of the first viewpoints in the first direction to the light-ray modulating element; and the light-ray modulating element is configured for, according to the visual-area widths of the first viewpoints in the first direction, performing phase modulation, and converging light rays emitted by each of the first viewpoint units to form a second viewpoint unit, so that all of viewpoints of the second viewpoint unit enter a corresponding single-eye pupil at a same time, wherein the second viewpoint unit includes at least two second viewpoints.

Optionally, the system controlling unit is further configured for, according to $w=LP/f$, calculating the visual-area widths of the first viewpoints in the first direction, and transmitting the visual-area widths of the first viewpoints in the first direction to the light-ray modulating element, wherein w is the visual-area widths of the first viewpoints in the first direction, L is a distance between the light-ray modulating element and the lens unit, P is a width of a pixel unit in the display panel in the first direction, and f is a height of placement of a lens in the lens unit.

Optionally, the 3D displaying system further includes a photographing element, and the photographing element is electrically connected to the system controlling unit; and the photographing element is configured for measuring a distance L between the light-ray modulating element and the lens unit, and transmitting L to the system controlling unit.

Optionally, the system controlling unit is further configured for, according to $w1=L0/w0*L1$, calculating the visual-area widths of the first viewpoints in the first direction, and transmitting the visual-area widths of the first viewpoints in the first direction to the light-ray modulating element, wherein w1 is a visual-area width in the first direction of the first viewpoint corresponding to the light-ray modulating element at a current position, L0 is a distance between the light-ray modulating element at an initial position and the lens unit, w0 is a visual-area width in the first direction of the first viewpoint corresponding to the light-ray modulating element at the initial position, and L1 is a distance between the light-ray modulating element at the current position and the lens unit.

Optionally, the 3D displaying system further includes a photographing element; the 3D displaying device further includes an image rendering unit: the eyeglass further includes a photographing unit: all of the photographing element, the image rendering unit and the photographing unit are electrically connected to the system controlling unit; the display panel is electrically connected to the image rendering unit;

the photographing element is configured for measuring in real time a distance between the light-ray modulating element and the lens unit, and transmitting the measured distance to the system controlling unit;

the photographing unit is configured for, when the light-ray modulating element is at the initial position, while the photographing unit is moving in the first direction, photographing an image formed by the first viewpoints, and when the image changes, recording a movement distance, and transmitting the movement distance to the system controlling unit;

the system controlling unit is further configured for, when the light-ray modulating element is at the initial position, while the photographing unit is moving in the first direction, transmitting an image controlling signal to the image rendering unit;

the image rendering unit is configured for, according to the image controlling signal, outputting an image signal to the display panel; and the display panel is configured for displaying according to the image signal, so that the first viewpoints form different images.

The above description is merely a summary of the technical solutions of the present application. In order to more clearly know the elements of the present application to enable the implementation according to the contents of the description, and in order to make the above and other purposes, features and advantages of the present application more apparent and understandable, the particular embodiments of the present application are provided below.

BRIEF DESCRIPTION OF THE DRAWINGS

In order to more clearly illustrate the technical solutions of the embodiments of the present application or the prior art, the figures that are required to describe the embodiments or the prior art will be briefly described below. Apparently, the figures that are described below are merely embodiments of the present application, and a person skilled in the art can obtain other figures according to these figures without paying creative work.

DETAILED DESCRIPTION

Figure 1:
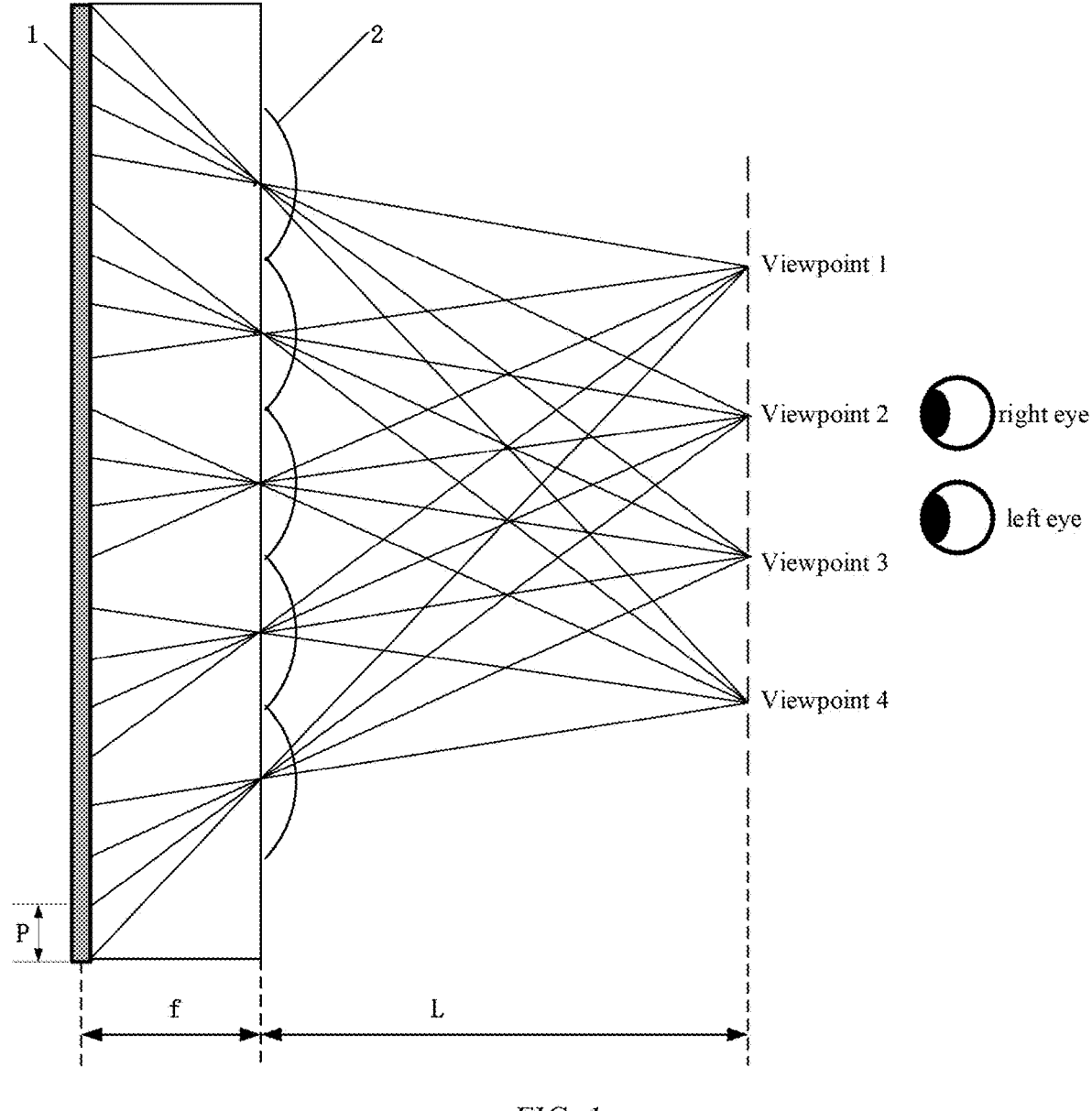
FIG. 1 is a multi-viewpoint optical-path diagram of a 3D displaying system according to an embodiment of the present application.

The technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

In the embodiments of the present application, terms such as "first" and "second" are used to distinguish identical items or similar items that have substantially the same functions and effects, merely in order to clearly describe the technical solutions of the embodiments of the present application, and should not be construed as indicating or implying the degrees of importance or implicitly indicating the quantity of the specified technical features.

In the embodiments of the present application, the meaning of "plurality of" is "two or more", and the meaning of "at least two" is "two or more", unless explicitly and particularly defined otherwise.

In the embodiments of the present application, the terms that indicate orientation or position relations, such as "upper" and "lower", are based on the orientation or position relations shown in the drawings, and are merely for conveniently describing the present application and simplifying the description, rather than indicating or implying that the device or element must have the specific orientation and be constructed and operated according to the specific orientation. Therefore, they should not be construed as a limitation on the present application.

Multi-viewpoint naked-eye 3D displaying is a commonly used mode of naked-eye 3D displaying currently, as shown in FIG. 1. By overlaying a displaying element 1 and a cylindrical-lens array 2, each of the cylindrical-lens units corresponds to one group of pixels of the displaying element, and the light rays of all of the pixels in the displaying element that have the same relative positions as those of the cylindrical lenses that have passed through the cylindrical lenses intersect to form a plurality of visual areas in the space. By graphic rendering, the images of the pixels under the same cylindrical lens can be provided with certain parallaxes, and therefore there are parallaxes among the images at the visual-area positions in the space. The left eye and the right eye of the observer, when located at the different viewpoints, can observe the images having the parallaxes, and the human brain fuses the images observed by the left eye and the right eye, thereby the 3D-displaying image is formed. In the multi-viewpoint naked-eye 3D displaying, the product of the resolution of each of the viewpoints and the quantity of the viewpoints is equal to the gross information content (the total sub-pixel quantity) of the displaying element. Higher viewpoint resolutions and viewpoint density provide a better naked-eye-3D visual effect, wherein the higher viewpoint resolutions provide a clearer 3D image, and a higher viewpoint density provides smooth transition between the parallaxes of the neighboring viewpoints. Under the condition that the gross information content of the displaying element is limited, it is required to balance the viewpoint resolution and the viewpoint density to obtain a better effect of 3D displaying.

Figures 2, 3:
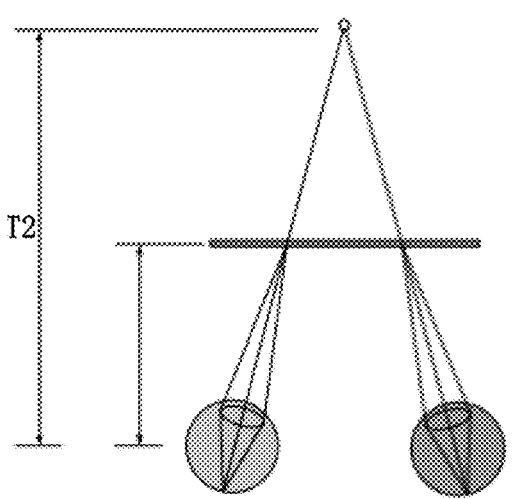
FIG. 2 is a principle diagram of vergence-accommodation conflict.
FIG. 3 is a structural diagram of a 3D displaying system according to an embodiment of the present application.

In conventional multi-viewpoint naked-eye 3D displaying devices, the 3D effect is generated based on the stereoscopic vision, vergence-accommodation conflict may exist. Vergence refers to that a person, in order to clearly see the target, is required to firstly adjust the two eyeballs, to move the two eyes to the direction of the target. Accommodation refers to that, in order to clearly see the target, it is further required to adjust the eyeballs to the correct focal lengths. The principle of stereo displaying is, based on the binocular parallax, by fusion of the parallax between the left eye and the right eye, generating a scene having a certain stereoscopic effect. Referring to FIG. 2, because the distance from the image seen by a single eye to the eye (i.e., the adjustment distance T1 shown in FIG. 2) is constant, but what the two eyes see is the image that is imaged in the space by using the binocular vergence effect (which, at this moment, corresponds to the vergence distance T2 shown in FIG. 2), the inconsistency between the vergence distance T2 and the adjustment distance T1 may result in conflict, and the two eyes are required to continuously perform balance adjustment between the vergence distance T2 and the adjustment distance T1, which causes visual fatigue of the human eyes.

In view of the above, an embodiment of the present application provides a light-ray modulating element, wherein the light-ray modulating element is applied to a 3D displaying system, and the 3D displaying system includes a 3D displaying device. Referring to FIG. 3, the 3D displaying device includes a display panel 10, and a lens unit 11 disposed at the light exiting side of the display panel 10.

Referring to FIG. 3, the light rays emitted by the display panel 10 pass through the lens unit 11, are shot to the light-ray modulating element 12, and form two first viewpoint units 13 at the light entering side of the light-ray modulating element 12, wherein each of the first viewpoint units includes at least two first viewpoints 14.

The light-ray modulating element 12 is configured for converging the light rays emitted by each of the first viewpoint units 13 to form a second viewpoint unit 15, so that all of the viewpoints of the second viewpoint unit enter a corresponding single-eye pupil 17 at a same time, wherein the second viewpoint unit 15 includes at least two second viewpoints 16.

It should be noted that FIG. 3 is illustrated by taking the 3D-displaying main-lobe region formed by one of the lenses in the lens unit as an example. The 3D-displaying main-lobe region refers to the region that is covered by the light rays emitted by all of the sub-pixels of the display panel that is covered by the lens unit via the lens unit.

The specific structure of the light-ray modulating element is not limited, as long as the corresponding function can be realized. The above-described single-eye pupil refers to the left-eye pupil or the right-eye pupil. In other words, under the effect of the light-ray modulating element, the light rays emitted by each of the first viewpoint units converge to form a second viewpoint unit, and all of the viewpoints of the second viewpoint unit enter the corresponding left-eye pupil or right-eye pupil at a same time. Referring to FIG. 3, the light rays emitted by the first viewpoint unit 13 located at the upper part in the direction OA converge to form the second viewpoint unit 15 located at the upper part in the direction OA, and the 3 viewpoints of the second viewpoint unit 15 located at the upper part in the direction OA enter the corresponding right-eye pupil at the same time. At the same time, the light rays emitted by the first viewpoint unit 13 located at the lower part in the direction OA converge to form the second viewpoint unit 15 located at the lower part in the direction OA, and the 3 viewpoints of the second viewpoint unit 15 located at the lower part in the direction OA enter the corresponding left-eye pupil at the same time.

The type of the display panel is not limited. The display panel may be liquid-crystal display panels such as the TN (Twisted Nematic) type, the VA (Vertical Alignment) type, the IPS (In-Plane Switching) type and the ADS (Advanced Super Dimension Switch) type, and may also be an OLED (Organic Light Emitting Diode) display panel.

The lens unit may include a plurality of lenses arranged in an array. The shapes of the lenses are not limited. As an example, the lenses may be cylindrical lenses, spherical lenses and so on.

The principle of alleviating the problem of the vergence-accommodation conflict will be described below.

Figure 5:
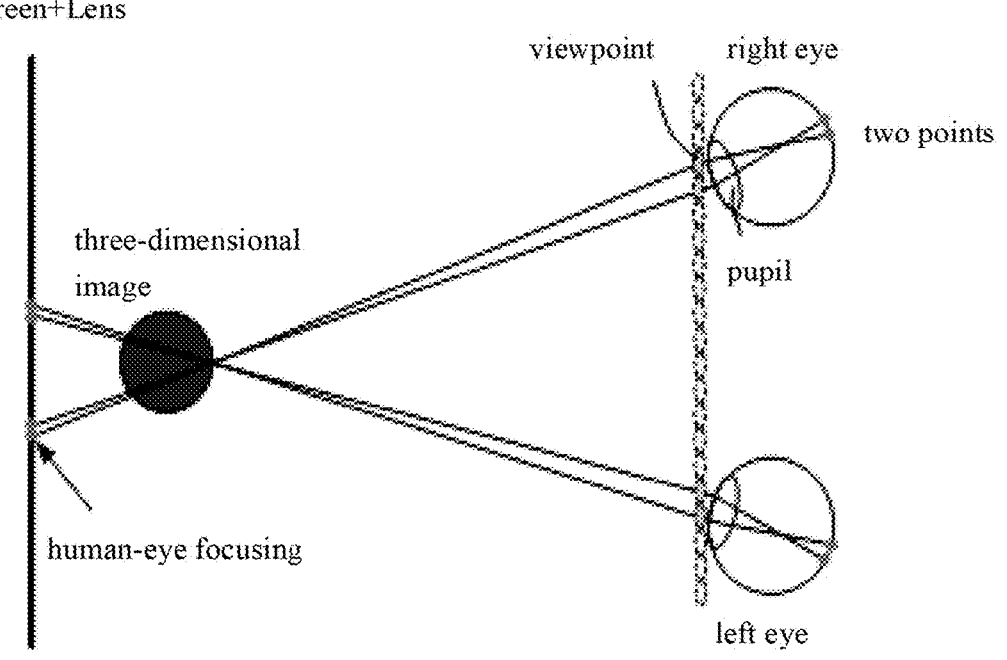
FIG. 5 is an optical-path diagram when the human eyes are focused on the display screen.
Figure 6:
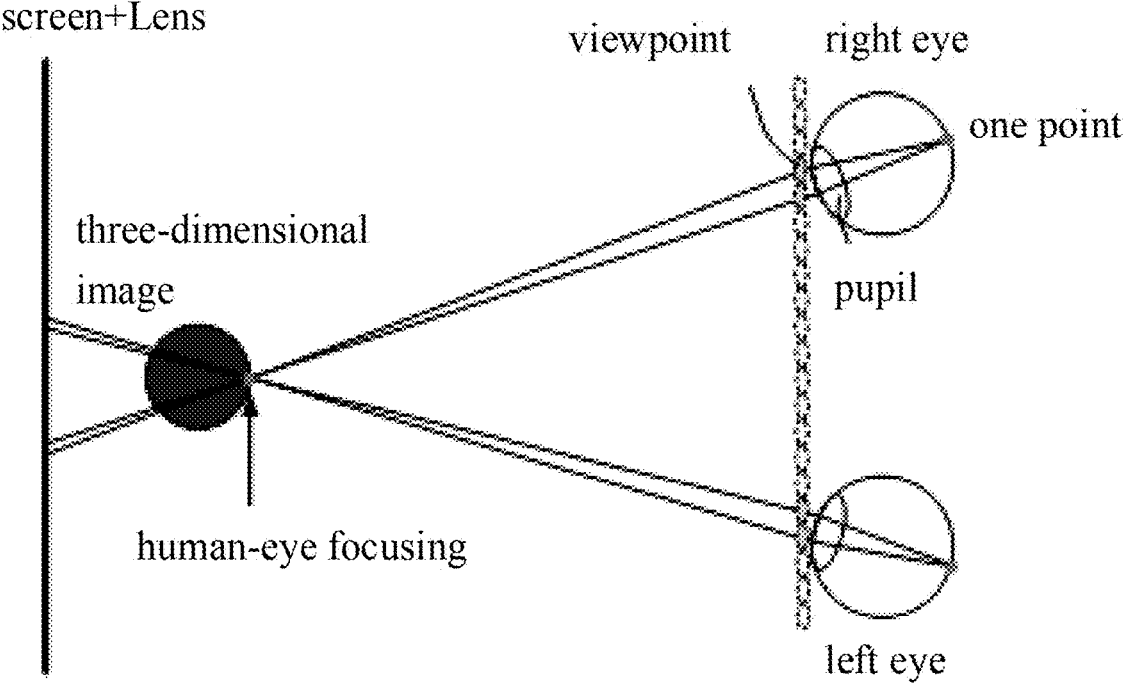
FIG. 6 is an optical-path diagram when the human eyes are focused on the 3D image.

In the ultra-multi-viewpoint naked-eye 3D displaying, the images of two or more viewpoints having parallaxes enter one pupil at a same time. Referring to FIG. 5, when the human eyes are focused on the display screen, two or more light spots may appear on the retina. Referring to FIG. 6, when the human eyes are focused on a 3D image, one clearer light spot may appear on the retina. In other words, when the multiple viewpoints enter the single-eye pupil at the same time, the human-eye focusing adjustment may actively adjust, to cause one clearer light spot to be imaged on the retina, so that the focusing position and the vergence position tend to be consistent, thereby the vergence-accommodation conflict is alleviated.

Figure 7:
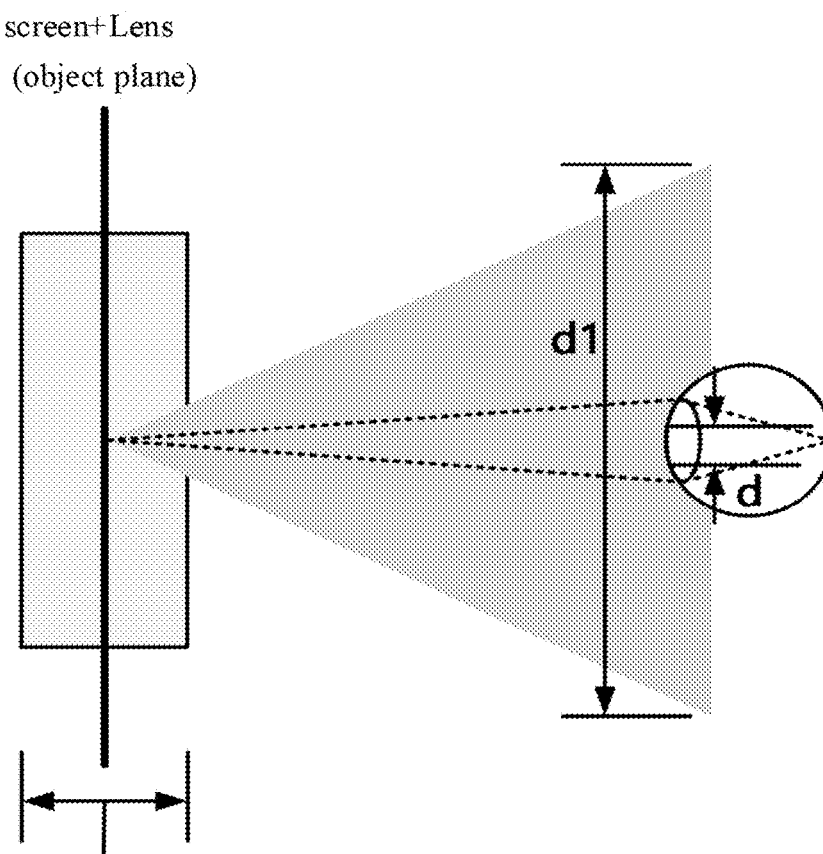
FIG. 7 is a schematic diagram of a corresponding depth-of-field range when the viewpoint width is greater than the human-eye pupil.
Figure 8:
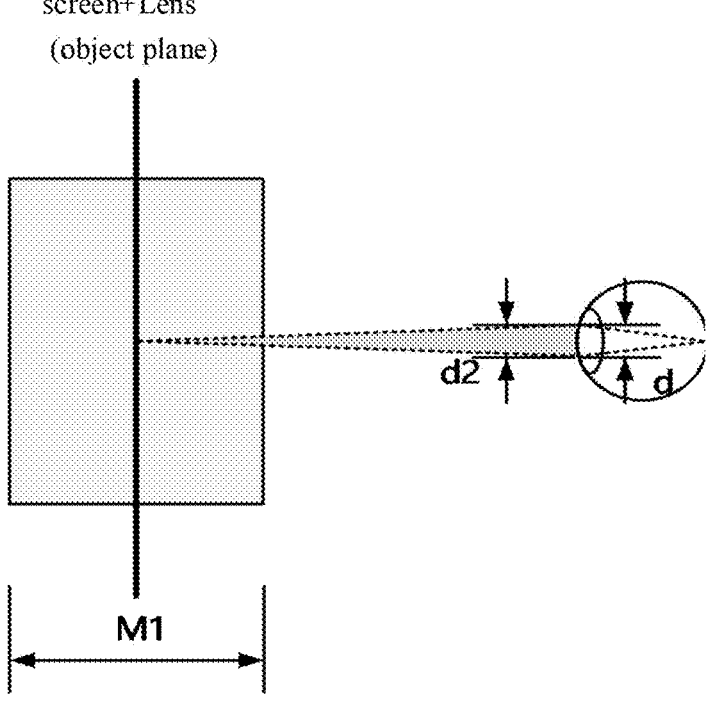
FIG. 8 is a schematic diagram of a corresponding depth-of-field range when the viewpoint width is less than the human-eye pupil.

In addition, when the visual range is constant, the visual depth-of-field range is determined by the aperture of the imaging lens. The lower the aperture is, the larger the depth-of-field range is. The depth of field refers to the range of the depth that imaging can be clearly performed. In common multi-viewpoint 3D displaying, referring to FIG. 7, the width d1 of one viewpoint is greater than the size d of one human-eye pupil, and therefore the depth-of-field range M of the entire vision system is decided by the size of the pupil. In the ultra-multi-viewpoint 3D displaying, referring to FIG. 1, the width d2 of one viewpoint is less than the size d of one pupil, and therefore the depth-of-field range of the vision system is decided by the width of the viewpoint. As compared with FIG. 7, in FIG. 8, the width of the viewpoint is less than the size of the pupil, and therefore the depthof-field range of the structure shown in FIG. 7 is increased to MI. Within the depth-of-field range, the human eyes can be focused to obtain a clear image, and if the vergence distance is within the depth-of-field range, the vergence guides the human eyes to be focused to the correct 3D-image depth position, thereby the problem of vergence-accommodation conflict is solved.

Based on the above-described two aspects, by regulating the viewpoint density in the multi-viewpoint 3D displaying, ultra-multi-viewpoint 3D displaying is realized, which can effectively alleviate the vergence-accommodation conflict in stereo displaying, to effectively alleviate the discomfortableness of the human eyes. In the present application, by disposing the light-ray modulating element, with the limited gross information content of the display panel, the light rays emitted by each of the first viewpoint units can converge to form the second viewpoint unit, to cause the plurality of first viewpoints that are originally evenly arranged to converge toward the human-eye positions, to form the plurality of second viewpoints, and finally to cause the plurality of second viewpoints of the second viewpoint unit to enter the corresponding single-eye pupil at a same time, thereby the limited viewpoints is effectively utilized, and the viewpoint density is increased. Furthermore, the problem of vergence-accommodation conflict can be alleviated to a great extent, thereby visual fatigue can be effectively alleviated, and thus the user experience is improved.

Figure 4:
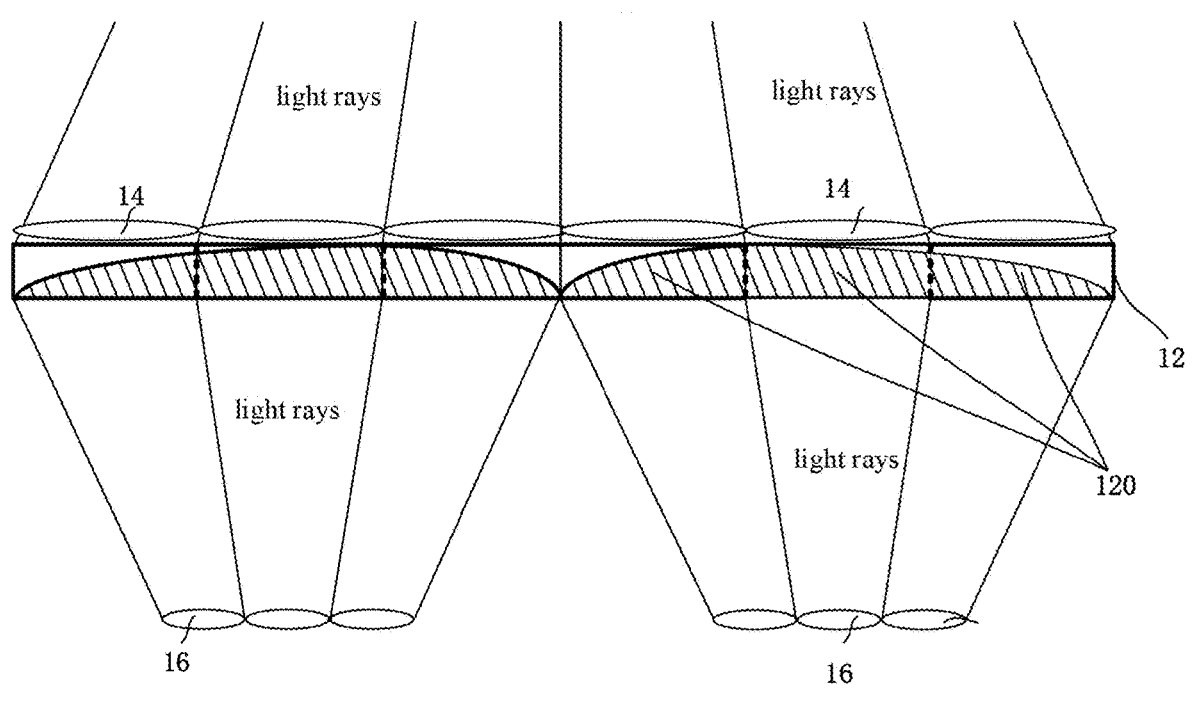
FIG. 4 is a structural diagram of the light-ray modulating element in FIG. 3.

Optionally, referring to FIG. 4, the light-ray modulating element 12 includes a plurality of light-ray modulating units 120, and each of the light-ray modulating units 120 is configured for converging the light rays emitted by the first viewpoints 13 to form the second viewpoints 16, so that the second viewpoints enter the corresponding single-eye pupil. The quantities of the first viewpoints, the second viewpoints and the light-ray modulating units are equal. FIG. 4 is illustrated by taking 6 first viewpoints, 6 second viewpoints and 6 light-ray modulating units as an example.

Accordingly, the plurality of first viewpoints can be modulated individually by using the plurality of light-ray modulating units, such a structure is simple and easy to implement.

Optionally, in order to reduce the difficulty in the implementation, referring to FIG. 3, the visual-area widths of the first viewpoints 14 in a first direction (the direction OA shown in FIG. 3) are equal, and the visual-area widths of the second viewpoints 16 in the first direction (the direction OA shown in FIG. 3) are equal.

Optionally, referring to FIG. 3, according to the triangular geometrical relation, the visual-area widths of the first viewpoints in the first direction (the direction OA shown in FIG. 3) $w=LP/f$.

Wherein L is the distance between the light-ray modulating element and the lens unit, P is the width of a pixel unit in the display panel in the first direction (the direction OA shown in FIG. 3), and f is the height of placement of a lens in the lens unit.

It should be noted that the display panel includes a plurality of pixel units arranged in an array, and each of the pixel units includes a plurality of sub-pixels. If the display panel is a liquid-crystal display panel, the widths of the sub-pixels included by each of the pixel units are equal, at this moment, P may be the width of the pixel units in the display panel in the first direction, and may also be the width of the sub-pixels in the display panel in the first direction. If the display panel is an OLED display panel, the widths of the sub-pixels (for example, R sub-pixels, B sub-pixels and G sub-pixels) included by the pixel units are unequal, in which case P may be the width of the pixel units in the display panel in the first direction.

If the display panel is a liquid-crystal display panel, the height of placement f of the lens in the lens unit may be the distance between the plane where the optic center O of the lens unit is located and the light-exiting face of the color-film layer of the display panel. If the display panel is an OLED display panel, the height of placement f of the lens in the lens unit may be the distance between the plane where the optic center O of the lens unit is located and the light-exiting face of the luminescent layer of the display panel.

The distance L between the light-ray modulating element and the lens unit may be the distance between the plane where the optic center O of the lens unit is located and the light entering face of the light-ray modulating element.

After the three values of L, P and f have been determined, the visual-area widths of the first viewpoints in the first direction can be obtained by calculation according to $w=LP/f$.

Figure 9:
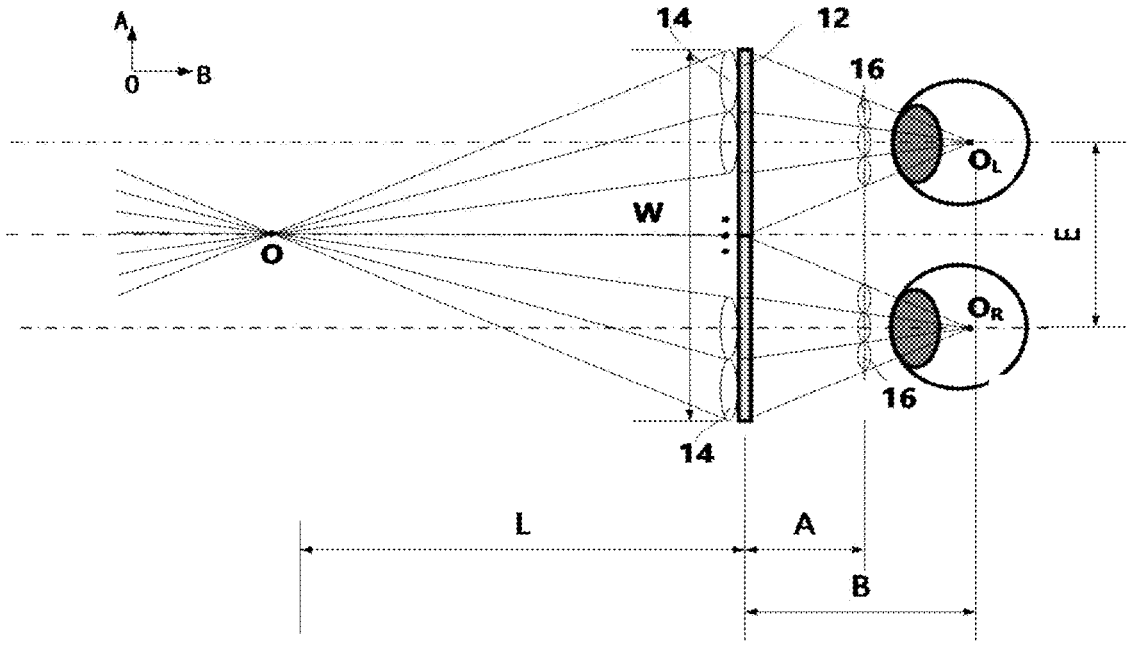
FIG. 9 is a schematic diagram of the displaying main-lobe region formed by a lens unit according to an embodiment of the present application.

Further optionally, referring to FIG. 9, the width of a displaying main-lobe region formed by the lens unit in the first direction (the direction OA shown in FIG. 9) $W=nw$, wherein n is the quantity of the first viewpoints, and w is the visual-area widths of the first viewpoints in the first direction.

From the above, it can be known that $w=LP/f$, accordingly, by substituting the calculation formula of w into the calculation formula of W, it can be obtained that $W=nw=n\ LP/f$, so that W can be obtained by calculation according to n, L, P and f.

Further optionally, referring to FIG. 9, in the second viewpoint unit, the intersection point of marginal rays of the second viewpoints in a human eye is a first intersection point (in FIG. 9, the first intersection points of the left eye and the right eye are labeled as $O_L$ and $O_R$ respectively), and the distance between the first intersection point and the light-ray modulating element $B=WA/(W-nV)$.

Wherein W is the width of the displaying main-lobe region formed by the lens unit in the first direction, A is the distance between the light-ray modulating element and the pupil of the human eye, n is the quantity of the first viewpoints, and V is the visual-area widths of the second viewpoints in the first direction.

It should be noted that, as compared with the distances between the second viewpoints in the second viewpoint unit and the light-ray modulating element, the distances between the second viewpoints in the second viewpoint unit and the human-eye pupil are very small, and are negligible, and the distances between the light-ray modulating element and the second viewpoints may be approximated as the distance between the light-ray modulating element and the human-eye pupil. Therefore, in FIG. 9, the distance A between the light-ray modulating element and the human-eye pupil does not include the distances between the second viewpoints in the second viewpoint unit and the light-ray modulating element.

Figure 10:
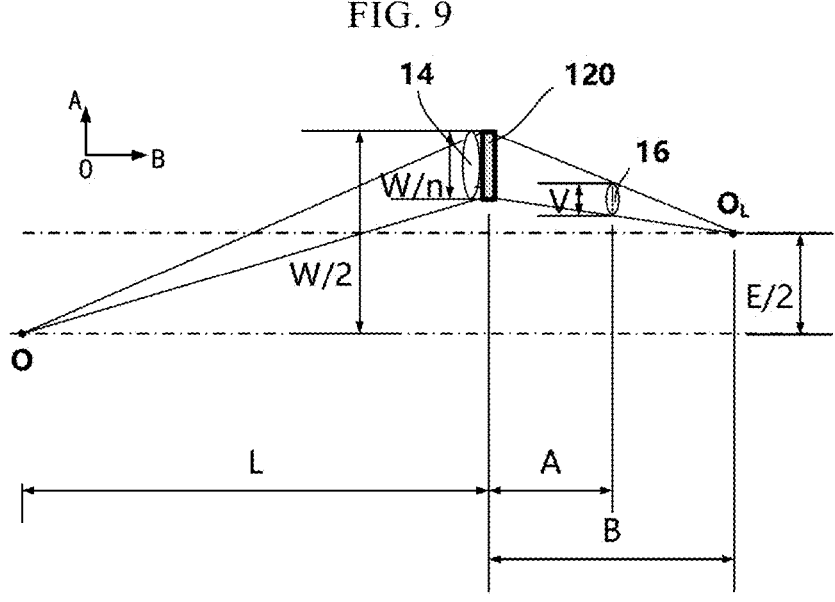
FIG. 10 is a schematic diagram of the modulation of the light-ray modulating unit located at the uppermost part in the direction OA in FIG. 3.

Referring to FIG. 10, taking the light-ray modulating unit located at the uppermost part in the direction OA as an example, after passing through the light-ray modulating element, the light rays emitted by the optic center O converge to $O_L$, wherein the visual-area width in the direction OA of the first viewpoint located at the uppermost part in the direction OA is W/n, the distance between the center of the first viewpoint located at the uppermost part in the direction OA and the main-lobe center line is $W/2-W/2n$, the visual-area width of the second viewpoint in the direction OA is V, the distance in the direction OA between $O_L$ and the straight line where the optic center O is located is E/2, and E is the interpupillary distance.

According to the triangular geometrical relation, it can be obtained that:

$$V/(W/n)=(B-A)/A$$

By deduction calculation, it can be obtained that $B=WA/(W-nV)$, wherein A may be a preset value greater than 10 mm, W may be obtained according to the above-described formula, and n and V may be preset in advance. At a same time, the sum of the widths of all of the second viewpoints entering the same pupil is less than the width of a single pupil, and because at least two second viewpoints enter the same pupil at the same time, therefore the width of the second viewpoint is required to be less than a half of the width of a single pupil. By using that formula, the value of B can be obtained by calculation. Subsequently, according to the position and the size of the first viewpoint, and the position and the size of the second viewpoint after the adjustment, the phase-modulation morphology of the light-ray modulating unit located at the uppermost part in the direction OA can be determined. The effect of the phase-modulation morphology of the light-ray modulating unit located at the uppermost part in the direction OA is, at the position where the light-ray modulating unit is located, converging the light rays emitted by the point O to the point $O_L$. The effects of phase modulation of the other light-ray modulating units are similar to that, and are not discussed further herein.

In one or more embodiments, the light-ray modulating element includes a liquid-crystal modulating element.

Figure 11:
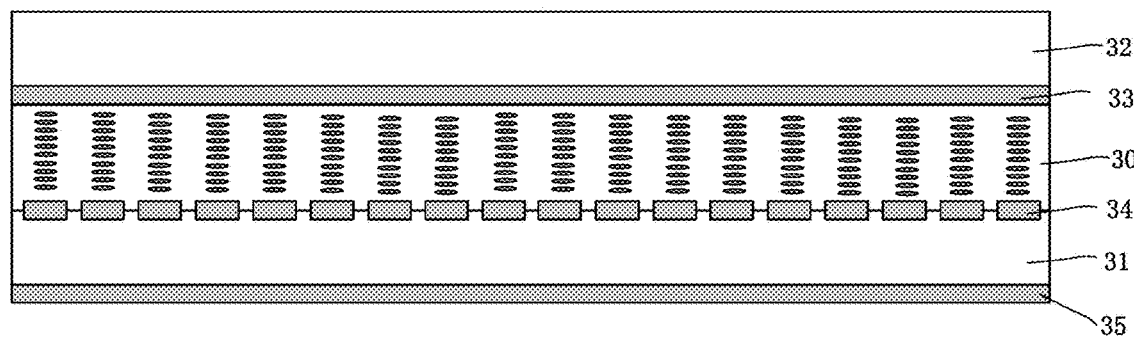
FIG. 11 is a structural diagram of a light-ray modulating element according to an embodiment of the present application.

Referring to FIG. 11, the liquid-crystal modulating element includes a first substrate 31 and a second substrate 32 that face each other, a liquid-crystal layer 30 and an electrode layer (which includes the first electrode 34 and the second electrode 33 in FIG. 11), the liquid-crystal layer 30 is disposed between the first substrate 31 and the second substrate 32, and the electrode layer is disposed at at least one side of the liquid-crystal layer. The first substrate is closer to the display panel than the second substrate is. The liquid-crystal layer is configured for, under the effect of an electric field generated by the electrode layer, being capable of modulating the phase of the incident light rays.

The specific structure of the electrode layer is not limited. The liquid-crystal layer, under the effect of an electric field, can generate different phase distributions, to deflect the light rays in different directions, to realize the phase-modulation morphologies required by the light-ray modulating units.

In some embodiments, referring to FIG. 11, the electrode layer includes a first electrode 34 and a second electrode 33, and the first electrode 34 and the second electrode 33 are disposed at two opposite sides of the liquid-crystal layer 30. The first electrode 34 includes a plurality of strip electrodes, and the second electrode 33 includes a planar electrode.

The first electrode and the second electrode may be fabricated by using a transparent electrode material, for example, ITO (Indium Tin Oxide).

Figure 12:
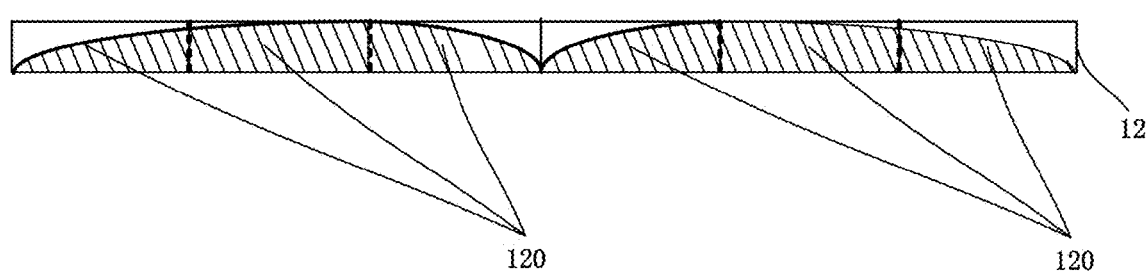
FIG. 12 is a schematic diagram of a phase-modulation morphology according to an embodiment of the present application.

The size of the light-ray modulating unit may be implemented by changing the quantity of the strip electrodes participating in the light-ray modulating unit. Specifically, the phase-modulation morphologies may be implemented by controlling the voltages of the strip electrodes in the light-ray modulating unit. Each of the phase modulation units can form different liquid-crystal phase-modulation morphologies. As an example, six light-ray modulating units 120 can form the liquid-crystal phase-modulation morphologies shown in FIG. 12.

Optionally, referring to FIG. 11, the liquid-crystal modulating element further includes a polarizer 35, and the polarizer is disposed at the side of the first substrate 31 close to the display panel. Because the liquid-crystal layer can merely modulate polarized lights, if the light rays emitted by the display panel are not polarized lights, it is required to dispose the polarizer. If the light rays emitted by the display panel are polarized lights, then it is not required to dispose the polarizer.

In one or more embodiments, the light-ray modulating element includes a holographic interference element of at least one wavelength.

Figure 13:
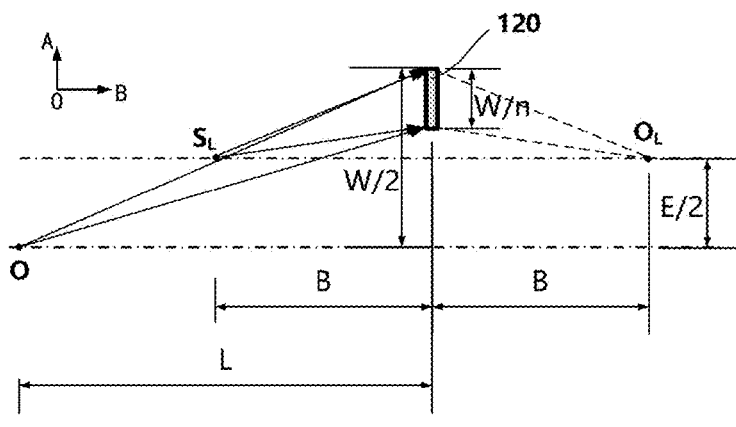
FIG. 13 is a principle diagram of the fabrication of a holographic interference element according to an embodiment of the present application.

The principle of the fabrication of the holographic interference element is as follows. Referring to FIG. 13, regarding the optic center O of the lens unit and the marginal rays of the first viewpoint located at the uppermost part in the direction OA, after passing through the light-ray modulating unit 120, the light rays are converged to $O_L$, wherein the visual-area width in the direction OA of the first viewpoint located at the uppermost part in the direction OA is W/n, the distance between the optic center O and the light-ray modulating element is L, the distance between the upper edge of the first viewpoint located at the uppermost part in the direction OA and the main-lobe center line is W/2, and the distance B between $O_L$, and the light-ray modulating element may be obtained by calculation by referring to the above formula.

Accordingly, the position of the symmetry point $S_L$ of $O_L$ with respect to the light-ray modulating unit can also be obtained. The holographic interference element may be obtained by using the spherical waves emitted by using the pointolite O and the pointolite $S_L$ (or the spherical wave emitted by the pointolite O and the spherical wave converging to the point $O_L$), and performing interference exposing at the position where the light-ray modulating unit located at the uppermost part in the direction OA is located. After the light rays emitted by the point O have passed through the holographic interference element, the light rays may be converged to the point $O_L$, thereby the function of adjustment of the viewpoint density is realized. Each of the light-ray modulating units includes one holographic interference element, and the holographic interference elements of the other light-ray modulating units may also be fabricated in that manner.

Optionally, in order to realize color displaying, if the light-ray modulating element includes holographic interference elements of multiple wavelengths, the light-ray modulating element includes a red-light-wavelength holographic interference element, a green-light-wavelength holographic interference element and a blue-light-wavelength holographic interference element that are arranged in layer configuration.

Figures 14, 15:
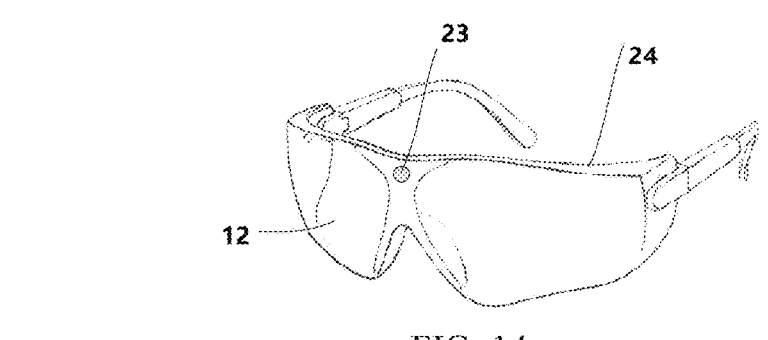
FIG. 14 is a schematic structural diagram of an eyeglass according to an embodiment of the present application.
FIG. 15 is a structural diagram of another 3D displaying system according to an embodiment of the present application.

An eyeglass is further provided by an embodiment of the present application shown in FIG. 14, wherein the eyeglass includes the light-ray modulating element 12 stated above.

It should be noted that the eyeglass may be observing glasses at a constant watching distance, or glasses worn by a user, which is not limited herein. By applying the eyeglass to the 3D displaying system, the viewpoint density can be increased with the limited gross information content of the display panel, the problem of vergence-accommodation conflict is alleviated to a great extent, thereby visual fatigue is effectively alleviated, and thus the user experience is improved.

Figure 16:
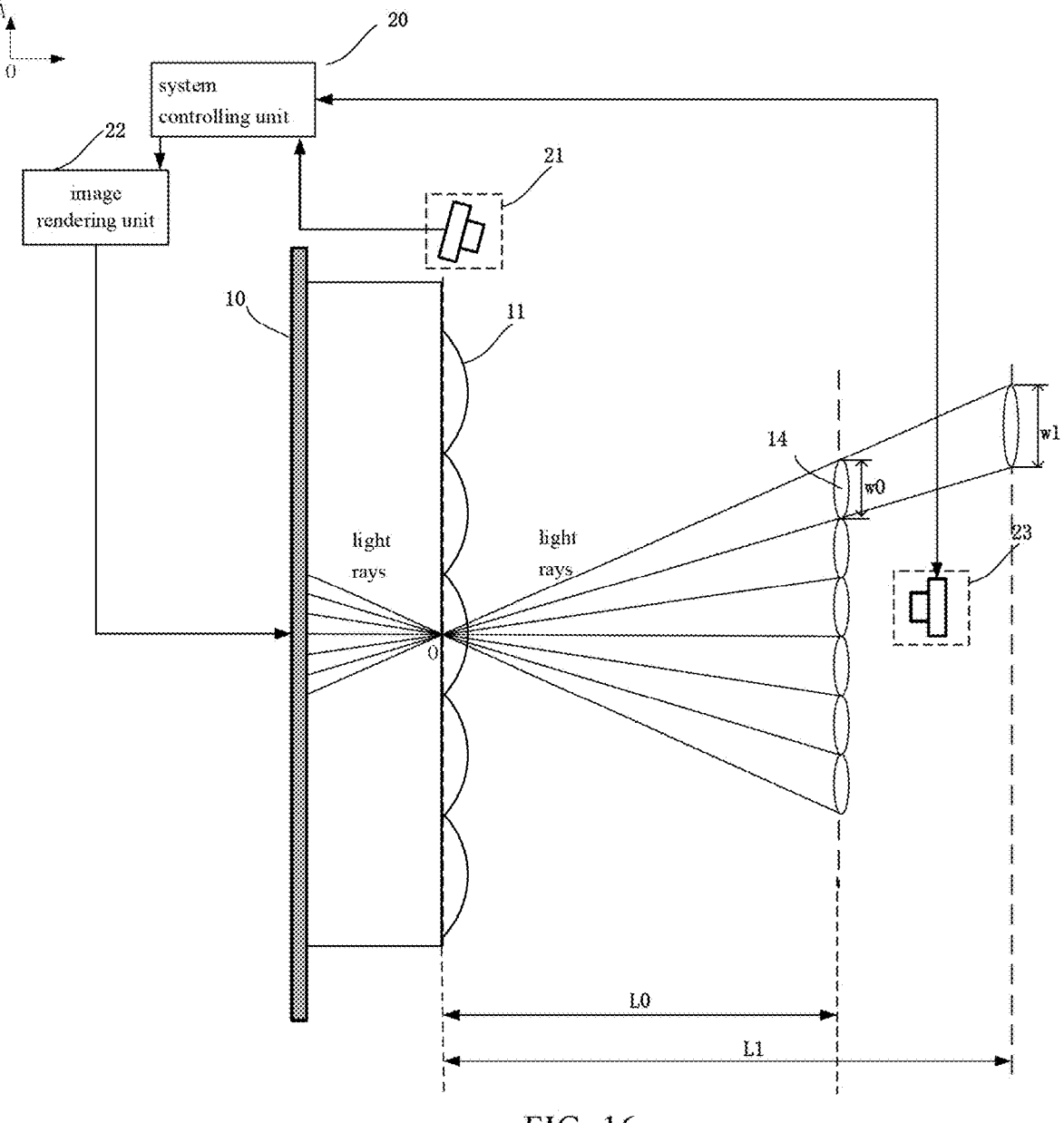
FIG. 16 is a diagram of the position relation of the corresponding first viewpoint before and after the watching distance changes in FIG. 15.
Figure 17:
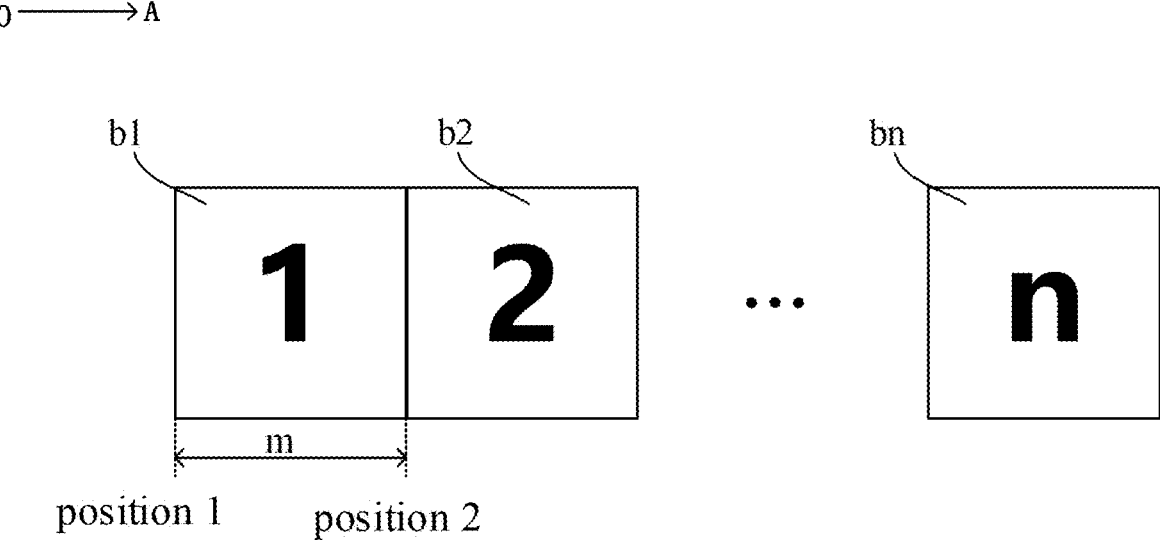
FIG. 17 is a schematic diagram of the images displayed by the plurality of first viewpoints when the photographing unit in FIG. 15 moves in the direction OA.

Optionally, referring to FIG. 14, the eyeglass further includes a photographing unit 23, and the photographing unit is configured for, when the light-ray modulating element is at an initial position, while the photographing unit is moving in the first direction, photographing an image formed by the first viewpoints, and when the image changes, recording the movement distance, and transmitting the movement distance to the 3D displaying device. Referring to FIGS. 15-17, the photographing unit 23 moves in the direction OA, photographs at the position 1 an image b1 of the first viewpoint whose serial number is 1, and photographs at the position 2 an image b2 of the first viewpoint whose serial number is 2, wherein the image b2 and the image b1 are different. The movement distance of the photographing unit is m; in other words, the width in the direction OA of the first viewpoint whose serial number is 1 is m. The photographing unit may include a camera, which are applied to scenes in which the watching distance varies.

Referring to FIG. 14, the eyeglass includes an eyeglass frame 24, the light-ray modulating element 12 is disposed inside the space defined by the eyeglass frame 24, and the photographing unit 23 is fixed to the eyeglass frame 24. Such a structure is simple and easy to implement.

A 3D displaying system is further provided by an embodiment of the present application, wherein the 3D displaying system includes the eyeglass stated above. The 3D displaying system can alleviate the problem of vergence-accommodation conflict to a great extent, thereby visual fatigue is effectively alleviated, and thus the user experience is improved.

Optionally, the 3D displaying system further includes a 3D displaying device. Referring to FIG. 3, the 3D displaying device includes the display panel 10, the lens unit 11 disposed at the light exiting side of the display panel 10, and a system controlling unit 20, and the system controlling unit 20 is electrically connected to the light-ray modulating element 12 of the eyeglass.

The light rays emitted by the display panel pass through the lens unit, are shot to the light-ray modulating element, and form two first viewpoint units at the light entering side of the light-ray modulating element, wherein each of the first viewpoint units includes at least two first viewpoints.

The system controlling unit is configured for, according to a predetermined algorithm, calculating the visual-area widths of the first viewpoints in the first direction, and transmitting the visual-area widths of the first viewpoints in the first direction to the light-ray modulating element.

The light-ray modulating element is configured for, according to the visual-area widths of the first viewpoints in the first direction, performing phase modulation, and converging the light rays emitted by each of the first viewpoint units to form a second viewpoint unit, so that all of the viewpoints of the second viewpoint unit enter a corresponding single-eye pupil at the same time, wherein the second viewpoint unit includes at least two second viewpoints.

The system controlling unit may include a chip such as a single chip microcomputer, an ARM (Advanced RISC Machine, advanced reduced instruction set computing machine) or an FPGA (Field Programmable Gate Array), which may be decided specifically according to practical design demands. The system controlling unit may be electrically connected to the light-ray modulating element by a wired or wireless communicative connection, which is not limited herein.

The specific structure and the relevant description of the light-ray modulating element may refer to the above description, and are not discussed further herein.

The 3D displaying system can alleviate the problem of vergence-accommodation conflict to a great extent, thereby visual fatigue is effectively alleviated, and thus the user experience is improved.

In one or more embodiments, the system controlling unit is further configured for, according to w=LP/f, calculating the visual-area widths of the first viewpoints in the first direction, and transmitting the visual-area widths of the first viewpoints in the first direction to the light-ray modulating element, wherein w is the visual-area widths of the first viewpoints in the first direction, L is the distance between the light-ray modulating element and the lens unit, P is the width of a pixel unit in the display panel in the first direction, and f is the height of placement of a lens in the lens unit. Here, it is required to obtain the values of L, P and f before w is determined. P and f may be obtained according to the design parameters, and L may be obtained by using the photographing element. The relevant description of the formula may be referred to the above relevant contents, and is not discussed further herein.

Optionally, in order to obtain the value of L, referring to FIG. 3, the 3D displaying system further includes a photographing element 21, and the photographing element 21 is electrically connected to the system controlling unit 20. The photographing element is configured for measuring the distance L between the light-ray modulating element and the lens unit, and transmitting L to the system controlling unit.

The structure of the photographing element is not limited. As an example, the photographing element may include a camera.

In one or more embodiments, the system controlling unit is further configured for, according to w1=L0/w0*L1, calculating the visual-area widths of the first viewpoints in the first direction, and transmitting the visual-area widths of the first viewpoints in the first direction to the light-ray modulating element, wherein w1 is the visual-area width in the first direction of the first viewpoint corresponding to the light-ray modulating element at the current position, L0 is the distance between the light-ray modulating element at the initial position and the lens unit, w0 is the visual-area width in the first direction of the first viewpoint corresponding to the light-ray modulating element at the initial position, and L1 is the distance between the light-ray modulating element at the current position and the lens unit.

The system controlling unit does not require obtaining in advance the width P of the pixel unit in the display panel in the first direction and the height of placement f of the lens in the lens unit, and is suitable for scenes in which the distance L between the light-ray modulating element and the lens unit varies.

Referring to FIG. 16, according to the triangular geometrical relation, w0/w1=L0/L1, and accordingly it is deduced that w1=L0/w0*L1. As long as L0, w0 and L1 are determined, w1 can be determined. L0 and L1 may be obtained by using the photographing element, and the mode of obtaining w0 is not limited.

A mode of obtaining the visual-area width w0 in the first direction of the first viewpoint corresponding to the light-ray modulating element at the initial position will be provided below.

Optionally, referring to FIG. 15, the 3D displaying system further includes a photographing element 21. The 3D displaying device further includes an image rendering unit 22. The eyeglass further includes a photographing unit 23. All of the photographing element 21, the image rendering unit 22 and the photographing unit 23 are electrically connected to the system controlling unit 20. The display panel 10 is electrically connected to the image rendering unit 22.

The photographing element is configured for measuring in real time the distance between the light-ray modulating element and the lens unit, and transmitting the measured distance to the system controlling unit.

The photographing unit is configured for, when the light-ray modulating element is at the initial position, while the photographing unit is moving in the first direction, photographing an image formed by the first viewpoints, and when the image changes, recording the movement distance, and transmitting the movement distance to the system controlling unit. Referring to FIGS. 15-17, the photographing unit 23 moves in the direction OA, orders the plurality of first viewpoints in the direction OA, photographs at the position 1 an image b1 of the first viewpoint whose serial number is 1, and photographs at the position 2 an image b2 of the first viewpoint whose serial number is 2, wherein the image b2 and the image b1 are different. The movement distance of the photographing unit is m; in other words, the width in the direction OA of the first viewpoint whose serial number is 1 is m. The widths in the direction OA of the first viewpoints of the other serial numbers can also be obtained by using that method.

The system controlling unit is further configured for, when the light-ray modulating element is at the initial position, while the photographing unit is moving in the first direction, transmitting an image controlling signal to the image rendering unit.

The image rendering unit is configured for, according to the image controlling signal, outputting an image signal to the display panel.

The display panel is configured for displaying according to the image signal, so that the first viewpoints form different images.

In other words, when the light-ray modulating element is at the initial position, the system controlling unit transmits the image controlling signal to the image rendering unit. The image rendering unit, according to the image controlling signal, outputs the image signal to the display panel. The display panel displays according to the image signal, so that the first viewpoints form different images. The photographing unit, while moving in the first direction, photographs the image formed by the first viewpoints, and when the image changes, records the movement distance, and transmits the movement distance (i.e., the visual-area width w0 in the first direction of the first viewpoint corresponding to the light-ray modulating element at the initial position) to the system controlling unit. The photographing element measures in real time the distance between the light-ray modulating element and the lens unit, and transmits the distance L0 between the light-ray modulating element at the initial position and the lens unit and the distance L1 between the light-ray modulating element at the current position and the lens unit to the system controlling unit. The system controlling unit obtains L0, L1 and w0, calculates according to w1=L0/w0*L1, and transmits w1 to the light-ray modulating element. The light-ray modulating element, according to the parameters such as w1, determines the phase-modulation morphologies, to realize the phase modulation.

The "one embodiment", "an embodiment" or "one or more embodiments" as used herein means that particular features, structures or characteristics described with reference to an embodiment are included in at least one embodiment of the present application. Moreover, it should be noted that here an example using the wording "in an embodiment" does not necessarily refer to the same one embodiment.

The description provided herein describes many concrete details. However, it can be understood that the embodiments of the present application may be implemented without those concrete details. In some of the embodiments, well-known processes, structures and techniques are not described in detail, so as not to affect the understanding of the description.

Finally, it should be noted that the above embodiments are merely intended to explain the technical solutions of the present application, and not to limit them. Although the present application is explained in detail with reference to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present application.

The invention claimed is:

1. A light-ray modulating element, wherein the light-ray modulating element is applied to a 3D displaying system, the 3D displaying system comprises a 3D displaying device, and the 3D displaying device comprises a display panel, and a lens unit disposed at a light exiting side of the display panel;
   wherein light rays emitted by the display panel pass through the lens unit, are shot to the light-ray modulating element, and form two first viewpoint units at a light entering side of the light-ray modulating element, each of the first viewpoint units comprises at least two first viewpoints; and
   the light-ray modulating element is configured for converging light rays emitted by each of the first viewpoint units to form a second viewpoint unit, so that all of viewpoints of the second viewpoint unit enter a corresponding single-eye pupil at a same time, wherein the second viewpoint unit comprises at least two second viewpoints;
   wherein the light-ray modulating element comprises a plurality of light-ray modulating units, and each of the light-ray modulating units is configured for converging light rays emitted by the first viewpoints to form the second viewpoints, so that the second viewpoints enter the corresponding single-eye pupil; and quantities of the first viewpoints, the second viewpoints and the light-ray modulating units are equal.

2. The light-ray modulating element according to claim 1, wherein the light-ray modulating element comprises a holographic interference element of at least one wavelength.

3. The light-ray modulating element according to claim 2, wherein when the light-ray modulating element comprises holographic interference elements of multiple wavelengths, the light-ray modulating element comprises a red-light-wavelength holographic interference element, a green-light-wavelength holographic interference element and a blue-light-wavelength holographic interference element that are arranged in layer configuration.

4. The light-ray modulating element according to claim 1, wherein visual-area widths of the first viewpoints in a first direction are equal, and visual-area widths of the second viewpoints in the first direction are equal.

5. The light-ray modulating element according to claim 4, wherein the visual-area widths of the first viewpoints in the first direction w=LP/f;
   wherein L is a distance between the light-ray modulating element and the lens unit, P is a width of a pixel unit in the display panel in the first direction, and f is a height of placement of a lens in the lens unit.

6. The light-ray modulating element according to claim 5, wherein a width of a displaying main-lobe region formed by the lens unit in the first direction W=nw, wherein n is the quantity of the first viewpoints, and w is the visual-area widths of the first viewpoints in the first direction.

7. The light-ray modulating element according to claim 6, wherein in the second viewpoint unit, an intersection point of marginal rays of the second viewpoints in a human eye is a first intersection point, and a distance between the first intersection point and the light-ray modulating element B=WA/(W−nV);
   wherein W is the width of the displaying main-lobe region formed by the lens unit in the first direction, A is a distance between the light-ray modulating element and a pupil of the human eye, n is the quantity of the first viewpoints, and V is the visual-area widths of the second viewpoints in the first direction.

8. The light-ray modulating element according to claim 1, wherein the light-ray modulating element comprises a liquid-crystal modulating element;
   the liquid-crystal modulating element comprises a first substrate and a second substrate that face each other, a liquid-crystal layer and an electrode layer, the liquid-crystal layer is disposed between the first substrate and the second substrate, and the electrode layer is disposed at at least one side of the liquid-crystal layer; the first substrate is closer to the display panel than the second substrate is; and
   the liquid-crystal layer is configured for, under an effect of an electric field generated by the electrode layer, being capable of modulating a phase of incident light rays.

9. The light-ray modulating element according to claim 8, wherein the electrode layer comprises a first electrode and a second electrode, and the first electrode and the second electrode are disposed at two opposite sides of the liquid-crystal layer; and
   the first electrode comprises a plurality of strip electrodes, and the second electrode comprises a planar electrode.

10. The light-ray modulating element according to claim 8, wherein the liquid-crystal modulating element further comprises a polarizer, and the polarizer is disposed at one side of the first substrate close to the display panel.

11. An eyeglass, wherein the eyeglass comprises the light-ray modulating element according to claim 1.

12. The eyeglass according to claim 11, wherein the eyeglass further comprises a photographing unit, and the photographing unit is configured for, when the light-ray modulating element is at an initial position, while the photographing unit is moving in a first direction, photographing an image formed by the first viewpoints, and when the image changes, recording a movement distance, and transmitting the movement distance to the 3D displaying device.

13. The eyeglass according to claim 12, wherein the eyeglass comprises an eyeglass frame, the light-ray modulating element is disposed inside a space defined by the eyeglass frame, and the photographing unit is fixed to the eyeglass frame.

14. A 3D displaying system, wherein the 3D displaying system comprises an eyeglass according to claim 11;
   wherein the 3D displaying device further comprises a system controlling unit, and the system controlling unit is electrically connected to the light-ray modulating element of the eyeglass;

wherein the system controlling unit is configured for, according to a predetermined algorithm, calculating visual-area widths of the first viewpoints in the first direction, and transmitting the visual-area widths of the first viewpoints in the first direction to the light-ray modulating element; and the light-ray modulating element is configured for, according to the visual-area widths of the first viewpoints in the first direction, performing phase modulation.

15. The 3D displaying system according to claim 14, wherein the system controlling unit is further configured for, according to w=LP/f, calculating the visual-area widths of the first viewpoints in the first direction, and transmitting the visual-area widths of the first viewpoints in the first direction to the light-ray modulating element, wherein w is the visual-area widths of the first viewpoints in the first direction, L is a distance between the light-ray modulating element and the lens unit, P is a width of a pixel unit in the display panel in the first direction, and f is a height of placement of a lens in the lens unit.

16. The 3D displaying system according to claim 15, wherein the 3D displaying system further comprises a photographing element, and the photographing element is electrically connected to the system controlling unit; and the photographing element is configured for measuring a distance L between the light-ray modulating element and the lens unit, and transmitting L to the system controlling unit.

17. The 3D displaying system according to claim 14, wherein the system controlling unit is further configured for, according to w1=L0/w0*L1, calculating the visual-area widths of the first viewpoints in the first direction, and transmitting the visual-area widths of the first viewpoints in the first direction to the light-ray modulating element, wherein w1 is a visual-area width in the first direction of the first viewpoint corresponding to the light-ray modulating element at a current position, L0 is a distance between the light-ray modulating element at an initial position and the lens unit, w0 is a visual-area width in the first direction of the first viewpoint corresponding to the light-ray modulating element at the initial position, and L1 is a distance between the light-ray modulating element at the current position and the lens unit.

18. The 3D displaying system according to claim 17, wherein the 3D displaying system further comprises a photographing element; the 3D displaying device further comprises an image rendering unit; the eyeglass further comprises a photographing unit; all of the photographing element, the image rendering unit and the photographing unit are electrically connected to the system controlling unit; the display panel is electrically connected to the image rendering unit;

the photographing element is configured for measuring in real time a distance between the light-ray modulating element and the lens unit, and transmitting the measured distance to the system controlling unit;

the photographing unit is configured for, when the light-ray modulating element is at the initial position, while the photographing unit is moving in the first direction, photographing an image formed by the first viewpoints, and when the image changes, recording a movement distance, and transmitting the movement distance to the system controlling unit;

the system controlling unit is further configured for, when the light-ray modulating element is at the initial position, while the photographing unit is moving in the first direction, transmitting an image controlling signal to the image rendering unit;

the image rendering unit is configured for, according to the image controlling signal, outputting an image signal to the display panel; and the display panel is configured for displaying according to the image signal, so that the first viewpoints form different images.

* * * * *